United States Patent [19]

Sasaki et al.

[11] Patent Number: 5,701,206
[45] Date of Patent: Dec. 23, 1997

[54] ROTARY FEED MECHANISM

[75] Inventors: Takamitsu Sasaki; Hiroshi Nomura, both of Tokyo, Japan

[73] Assignee: Asahi Kogaku Kogyo Kabushiki Kaisha, Tokyo, Japan

[21] Appl. No.: 672,337

[22] Filed: Jun. 28, 1996

[30] Foreign Application Priority Data

Jun. 30, 1995 [JP] Japan ..................... 7-166442

[51] Int. Cl.$^6$ ................ G02B 15/14; G02B 7/02
[52] U.S. Cl. .................. 359/704; 359/823; 359/829
[58] Field of Search .................... 359/704, 706, 359/829, 823, 826, 894

[56] References Cited

U.S. PATENT DOCUMENTS

| | | | |
|---|---|---|---|
| 4,385,023 | 5/1983 | Sumi | 264/221 |
| 5,051,764 | 9/1991 | Nomura | 354/195.1 |
| 5,164,757 | 11/1992 | Nomura | 354/403 |
| 5,386,740 | 2/1995 | Nomura et al. | 74/89.16 |
| 5,469,300 | 11/1995 | Nomura | 359/700 |
| 5,488,513 | 1/1996 | Tanaka | 359/699 |
| 5,587,843 | 12/1996 | Chen | 359/700 |
| 5,594,589 | 1/1997 | Chen | 359/826 |

FOREIGN PATENT DOCUMENTS

| | | | |
|---|---|---|---|
| 31237445 | 3/1982 | Germany | 359/829 |

*Primary Examiner*—David C. Nelms
*Assistant Examiner*—Ricky Mack
*Attorney, Agent, or Firm*—Greenblum & Bernstein, P.L.C.

[57] ABSTRACT

A rotary feed mechanism of a camera includes a stationary barrel secured to a camera body. Multiple-female threads are provided in an inner surface of the stationary barrel. A rotatable barrel is coaxially and movably inserted in the stationary barrel. The rotatable barrel is provided with multiple-male threads on an inner surface to engage the multiple-female threads of the stationary barrel. The linearly movable lens barrel is provided with multiple-male threads to engage the multiple-female threads of the stationary barrel. The linearly movable lens barrel supports a plurality of lenses arranged to be movable in an optical axis direction. A linear guide is provided on the linearly movable lens barrel, for moving the linearly movable lens barrel along the optical axis direction without causing rotation while the rotatable barrel is rotated. The linear guide has a projection to be guided by a linear guide groove formed on the stationary barrel. An idle device is provided on the stationary barrel for substantially preventing the rotatable barrel from advancing in the optical axis direction with respect to the stationary barrel only when the rotatable barrel is being assembled in the predetermined initial position with respect to the stationary barrel.

24 Claims, 9 Drawing Sheets

ROTARY FEED MECHANISM

BACKGROUND OF THE INVENTION

1. Field of the Invention

The present invention relates to a rotary feed mechanism comprises a cylindrical member and an inner cylindrical member, which is coaxially inserted in the cylindrical member by means of multiple-start threads provided. It should be noted that throughout the specification and claims, the multiple-start threads are described as multiple-male threads and multiple-female threads for the purpose of clarity.

2. Description of the Related Art

In recent compact cameras having a zoom lens, a lens barrel is normally accommodated in a camera body when the camera is not used and is advanced outwardly or forwardly when the camera is used. An arrangement like this has been materialized for the purpose of shortening the accommodation length of the lens barrel in order to make the camera body thin, and in the long run the entire camera body smaller.

The lens barrel incorporated in the compact camera generally comprises, for example, a rotatable barrel, a linearly movable barrel which is inserted in the rotary barrel, and a cam barrel which is provided between the rotatable barrel and the lens barrel. The linearly movable barrel is provided with a radially extending guide pin, which is loosely fitted in a linear movement guide groove formed on the inner peripheral surface of the rotatable barrel and a cam groove of the cam barrel. In the lens barrel as constructed above, when a zoom switch is operated, the rotatable barrel is rotated by a zoom motor, so that the guide pin of the linearly movable barrel is moved in accordance with the relationship between the linear movement guide groove of the rotary barrel and the cam groove of the cam barrel to advance the linearly movable barrel in the optical axis direction. Consequently, the spatial distance between a lens and at least another lens, both of which are held in the movable barrel, is varied to vary the focal length.

When the lens barrel is being assembled, the rotatable barrel, the linearly movable barrel and a linear movement guide member, etc., are fitted in one another. In general, these members are provided, on a predetermined portion, with an engaging member to move at least two members together in the optical axis direction with or without rotation.

In the conventional lens barrel, in which the rotatable barrel is associated with the linearly movable barrel through the cam mechanism, there is a play therebetween, so that the linearly movable barrel tends to be inclined with respect to the optical axis. To prevent this, it is necessary to provide a separate support which firmly holds the linearly movable barrel, which however increases the number of the components of the lens barrel. As a solution to this problem, it has been proposed that the rotatable barrel be associated with the linearly movable barrel through multiple-male and female threads without the cam mechanism.

In this solution, it is possible to eliminate the play between the rotatable barrel and the linearly movable barrel without increasing the number of the components, but in the process of assembling the lens barrel, the linearly movable barrel which is relatively rotated by a predetermined angle with respect to the rotatable barrel, is inevitably advanced in accordance with the constant engagement of the multiple-male and female threads. In particular, an advancing distance of the linearly movable barrel becomes longer as the lead of the multiple threads become longer.

It is therefore necessary to provide, in advance, an inner space within the camera body, corresponding to the advancing distance of the linearly movable barrel, so that the linearly movable barrel can be retracted in the inner space prior to the relative rotation of the rotatable barrel and the linearly movable barrel. However, the inner space, which is necessary only for the assembling or disassembling operation, is useless when the camera is normally used, and constantly having such a useless space is against the recent trend of compact cameras in which the thickness thereof in the optical axis direction is made as small as possible.

In addition to the above, it should also be noted that multiple-start threads in general are difficult to engage due to densely and finely formed screw threads. In other words, those who try to engage the multiple-start threads may, more often than not, experience difficulties in locating a position where the multiple-male and multiple-female threads can be smoothly engaged.

SUMMARY OF THE INVENTION

It is an object of the present invention to provide a rotary feed mechanism having an outer annular member and an inner annular member which engage each other through internal and external multiple-start threads, wherein the assembling and disassembling operations can be carried out without providing an inner space which has been necessary only for the assembling and disassembling operations, behind the inner annular member in the camera body. In addition to the above, according to the present invention, the multiple-start threads can be smoothly engaged without difficulties that have been experienced in conventional rotary feed mechanisms.

To achieve the objective, according to an aspect of the present invention, there is provided a rotary feed mechanism comprising a stationary barrel secured to a camera body, and the stationary barrel provided with multiple-female threads in an inner surface of the stationary barrel; a rotatable lens barrel to be coaxially and movably inserted in the stationary barrel, the rotatable lens barrel provided with multiple-male threads to engage the multiple-female threads on a predetermined surface portion of the rotatable lens barrel, and the rotatable lens barrel provided with multiple-female threads in an inner surface of the rotatable lens barrel. A linearly movable lens barrel is coaxially inserted in the rotatable lens barrel. The linearly movable lens barrel is provided with multiple-male threads, on a predetermined surface portion thereof. The multiple-male threads engage the multiple-female threads. The linearly movable lens barrel supports a plurality of lenses arranged to be movable in an optical axis direction. Linear guiding means are provided on the linearly movable lens barrel, for moving the linearly movable lens barrel along the optical axis direction without causing rotation while the rotatable lens barrel is being rotated. The linearly guiding means have a projection to be guided by a linear guide groove formed on the stationary barrel. Idling means are provided on the stationary barrel, for substantially preventing the rotatable lens barrel from advancing in the optical axis direction with respect to the stationary barrel only when the rotatable lens barrel is being assembled in a predetermined initial position with respect to the stationary barrel.

The disclosure relates to the subject matter contained in Japanese patent application No. 7-166442 (filed on Jun. 30, 1995), which is expressly incorporated by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
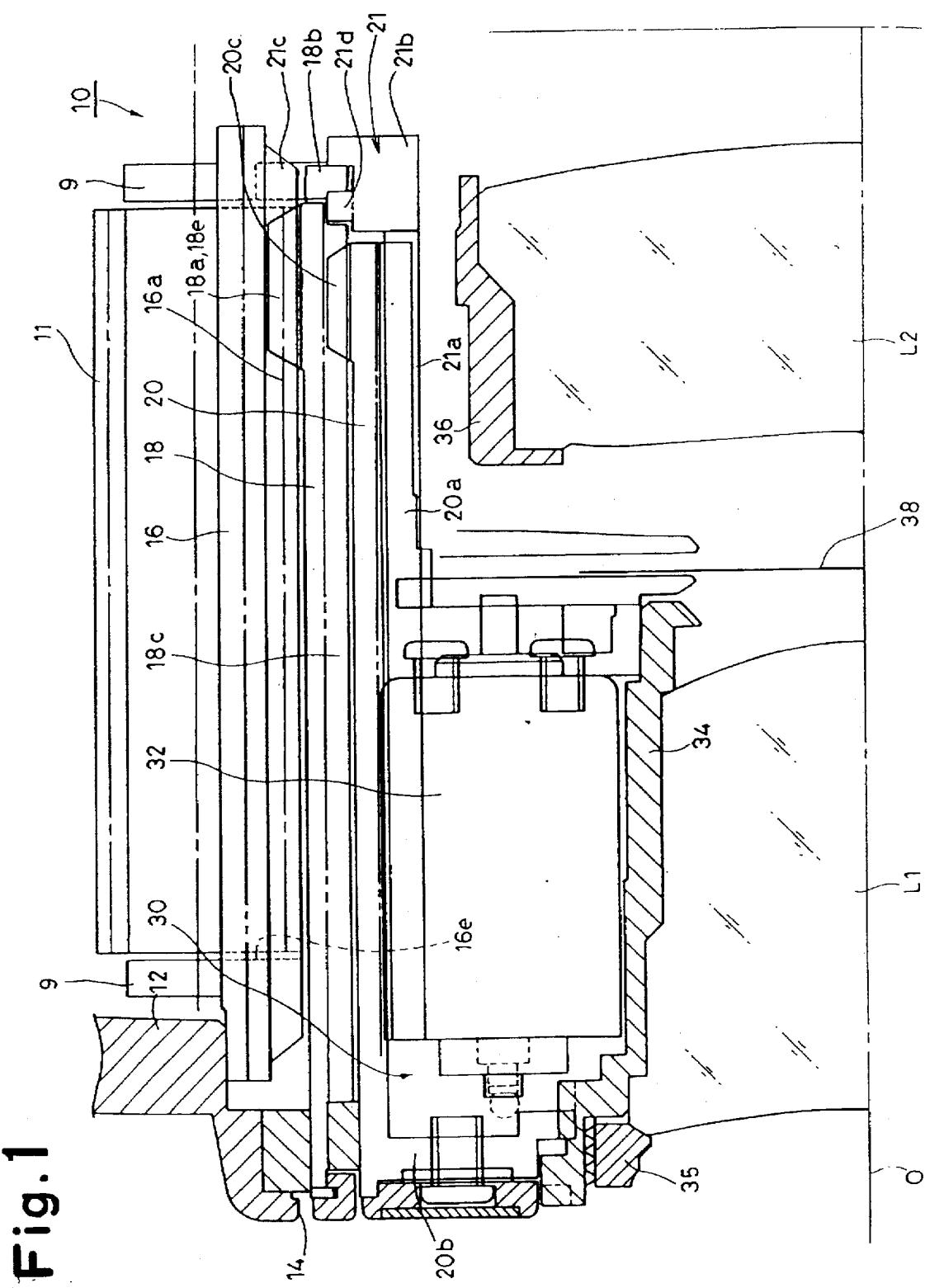
FIG. 1 is a sectional view of an upper half of a lens barrel with respect to the optical axis, according to the present invention.
Figure 11:
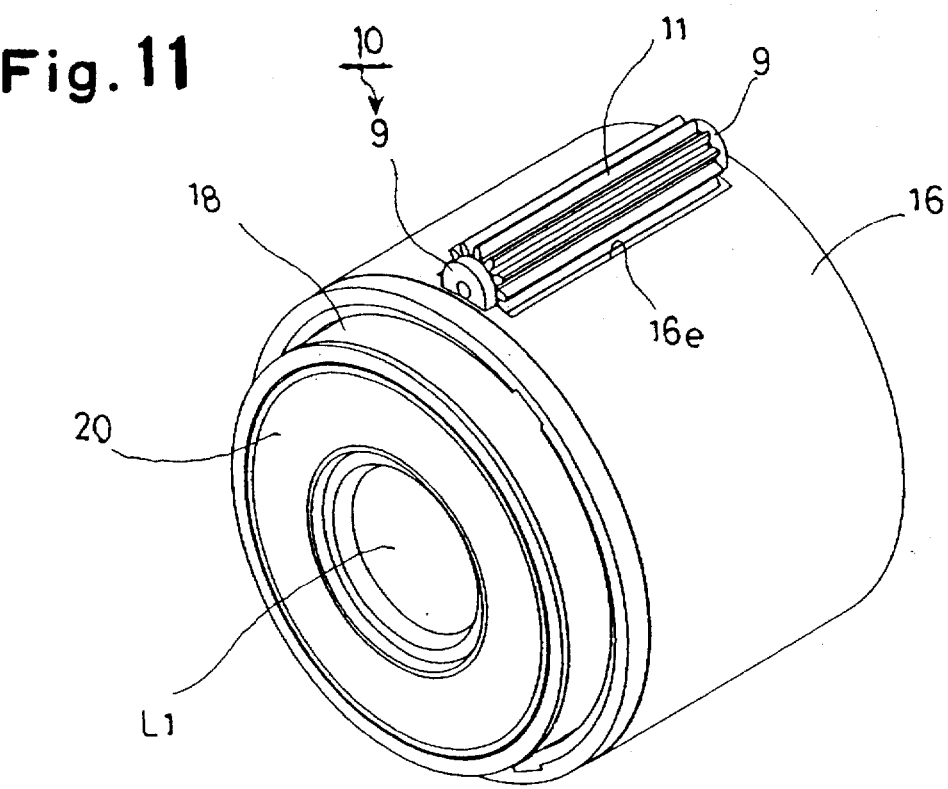
FIG. 11 is a perspective view of the lens barrel shown in an accommodated position, to which the present invention is applied; and, FIG. 12 is a perspective view of the lens barrel shown in an advanced position, to which the present invention is applied.
Figure 12:
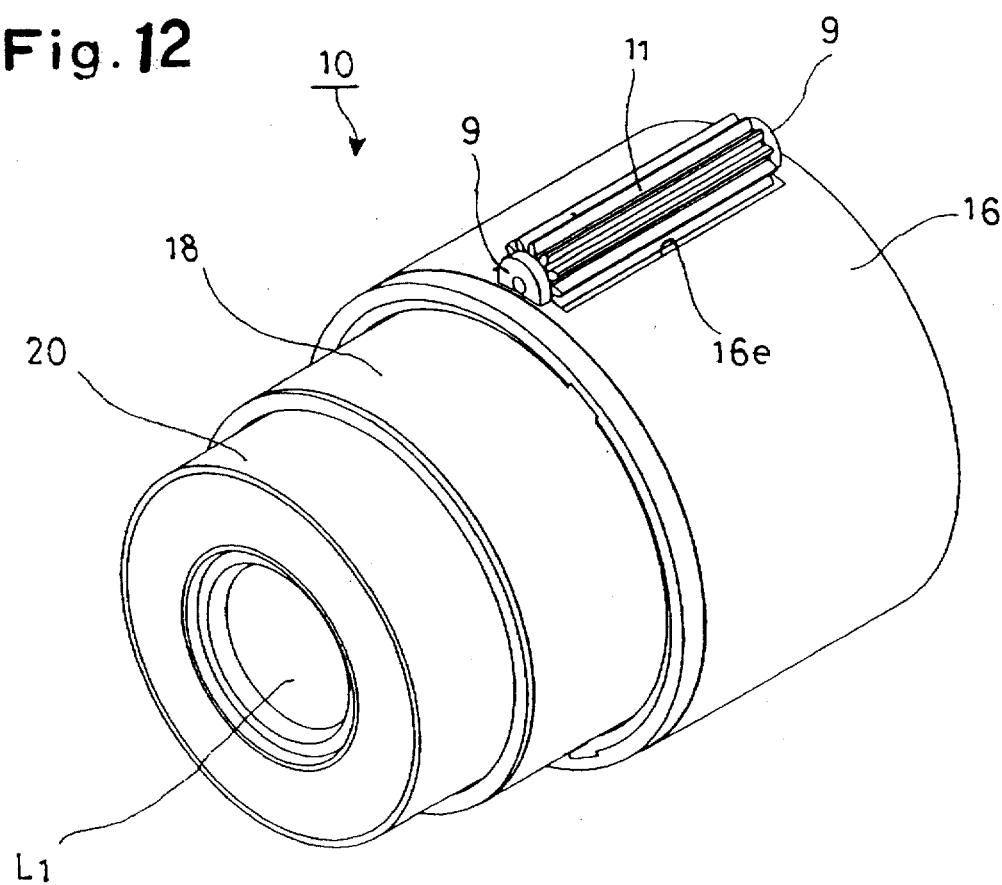

FIG. 1 shows a sectional side view of a lens barrel 10 of a compact camera to which the present invention is applied. In FIG. 1, the lenses are located in the most retracted position (an accommodating position). FIGS. 11 and 12 show perspective views of the lens barrel 10 shown FIG. 1, in an accommodating position and an external position, respectively. The lens barrel 10 comprises a stationary barrel 16 secured to a camera body 12, a rotatable barrel 18 which is rotatably inserted in the inner peripheral surface of the stationary barrel 16 through a thread-engagement, and a linearly movable barrel 20 which is inserted in the inner peripheral surface of the rotatable barrel 18 through a thread-engagement.

The stationary barrel 16 is provided with (i) a gear receiving Grooves 16e which are elongated in the axial direction to receive an elongated pinion 11, (ii) bearings 9 which are provided on the opposed ends, along the optical axis, of the gear receiving grooves 16e, (iii) multiple-female threads 16a which are provided on the substantially entire inner peripheral surface of the stationary barrel 16, and (iv) a plurality of linear movement guide grooves 16d (FIG. 2) provided on the inner peripheral surface of the stationary barrel 16 and extending in parallel with the optical axis 0. There are no multiple-female threads 16a on the inner peripheral surface of the stationary barrel 16 at a portion corresponding to the locus of the movement of an outer peripheral thread (outer gear) 18e of the rotatable barrel 18 (see FIG. 2). The pinion 11 which is rotatably supported, at the ends, by the bearings 9, engages, on the outer periphery side of the stationary barrel 16, a pinion (not shown), provided in the camera body to transmit the rotation (torque) from the zoom motor and also engages, on the inner periphery side of the stationary barrel, the outer peripheral thread 18e provided on the rear end of the rotatable barrel 18. The pinion 11 has a predetermined length so that the length secures the maximum possible traveling distance of the rotatable barrel 18 while the outer peripheral thread 18e constantly engages the pinion 11.

Figure 2:
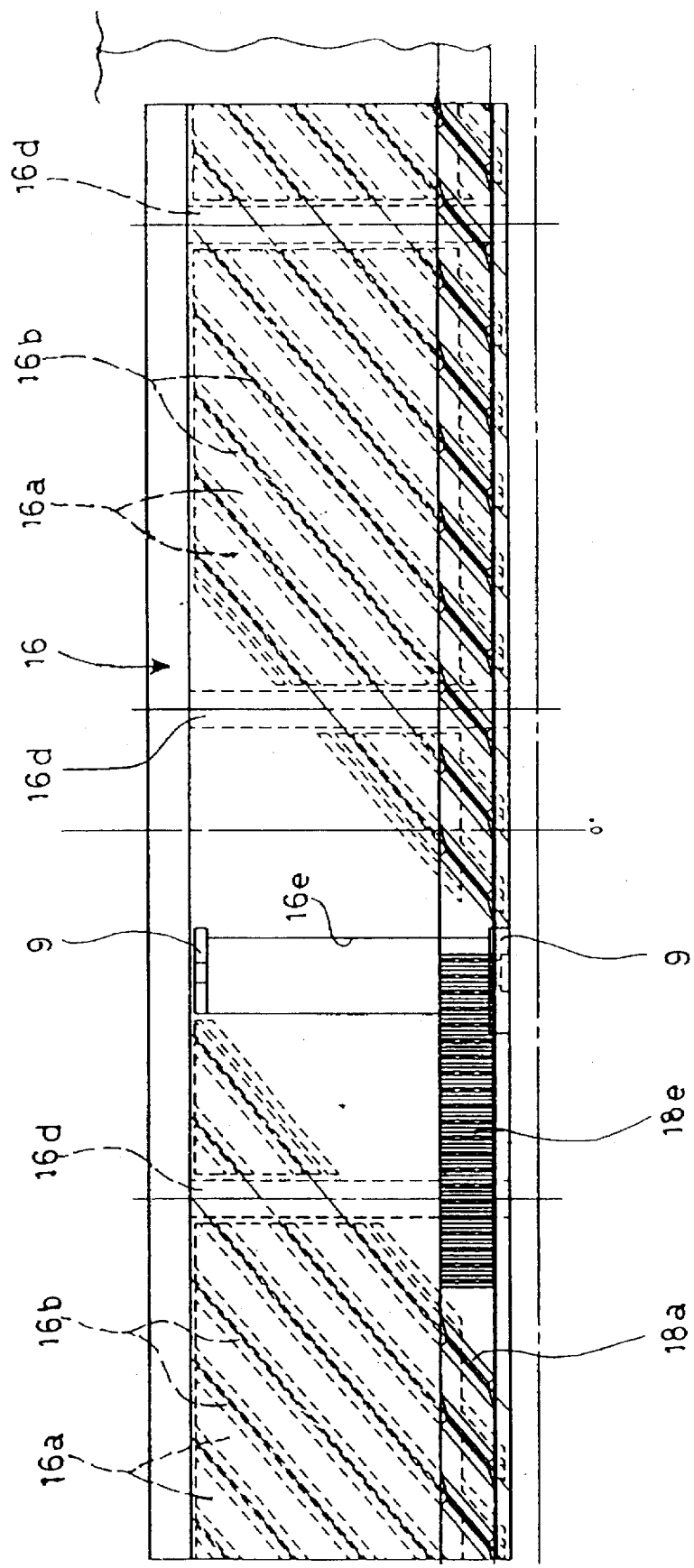
FIG. 2 is a developed plane view of an engagement of a stationary lens barrel and a rotatable lens barrel in a state shown in FIG. 3, as viewed through the stationary barrel.

The rotatable barrel 18 is provided, on the outer peripheral surface of the rear end thereof, with multiple-male threads 18a which are in mesh with the multiple-female threads 16a. It should be noted that the multiple-male threads 18a and the outer peripheral thread 18e are both provided on the same outer peripheral portion, having a predetermined width along the optical axis, of the rotatable barrel 18. In other words, the outer peripheral threads 18e and the multiple-male threads 18a share the same outer peripheral portion. Accordingly, where the multiple-male threads 18a are provided there are no outer peripheral threads 18e, and vice versa as shown in FIG. 2.

The rotatable barrel 18 is also provided with multiple-female threads 18c provided on the substantially entire inner peripheral surface thereof and hook-like projections 18b which project rearwardly in the optical axis direction.

The hook-like projections 18b are bent at the front ends thereof in the radial and inward direction. The bent ends of the hook-like projections 18b are arranged to be first inserted in cut-away portions (recesses) 21g of a linear movement guide member 21 (will be discussed hereinafter), and by the relative rotation between the linear movement guide member 21 and the rotatable barrel 18, the bent ends are then fitted in an outer peripheral flange 21d of the linear movement guide member 21.

The linearly movable barrel 20 is provided with multiple-male threads 20c which engage the multiple-female threads 18c. The linearly movable barrel 20 is also provided with a cylindrical portion 20a which is inserted in the linearly movable barrel 20, and an inner peripheral flange 20b which extends parallel with the optical axis of the lenses from the front end of the cylindrical portion 20a.

There is an AF/AE shutter unit 30 having an autofocusing DC motor 32 and a photo-interrupter (not shown), etc., in the cylindrical portion 20a. The AF/AE shutter unit 30 has shutter blades 38 which open and close in accordance with an object brightness signal supplied from a photometer (not shown). The DC motor 32 is driven after the linearly movable barrel 20 is advanced forwardly in the optical axis direction together with the AF/AE shutter unit 30, a front lens group L1 and a rear lens group L2, to move the rear lens group L2 relatively to the first lens group L1. Thus, the adjustment of the spatial distance between the lens groups and the adjustment of the focal length (focusing operation) are carried out. The front lens group L1 is held by a front lens group supporting frame 34 which is in turn held by the inner periphery of the AF/AE shutter unit 30, through a lens holding barrel 35.

The rear lens group L2 is provided behind the front lens group L1 in the linearly movable barrel 20. The rear lens group L2 is supported by a rear lens group supporting frame 36, which is in turn supported by a guide means (not shown)

per se known in a manner that the rear lens group supporting frame 36 is linearly movable along the optical axis. Accordingly, the rear lens group L2 is linearly movable with respect to the linearly movable barrel 20 in the optical axis direction.

The AF/AE shutter unit 30 is provided with a feed screw portion (not shown) which extends rearwardly in the optical axis direction. The feed screw portion is connected, at its front end, to the DC motor 32 and is engaged, at the rear end, in a threaded hole (not shown) formed in the rear lens group supporting frame 36. The AF/AE shutter unit 30 drives (rotates) the DC motor 32 in accordance with an object distance signal supplied from an object distance device (not shown) per se known, to thereby move the rear lens group L2, relative to the front lens group L1, to an in-focus position. The traveling distance of the rear lens group L2 is determined by stopping the DC motor 32 when the photo-interrupter (not shown) detects that the angular displacement of the feed screw amounts to a predetermined angular displacement corresponding to the object distance signal.

Embodiments of a rotary feed mechanism to which the present invention is applied will be discussed below.

Figure 3:
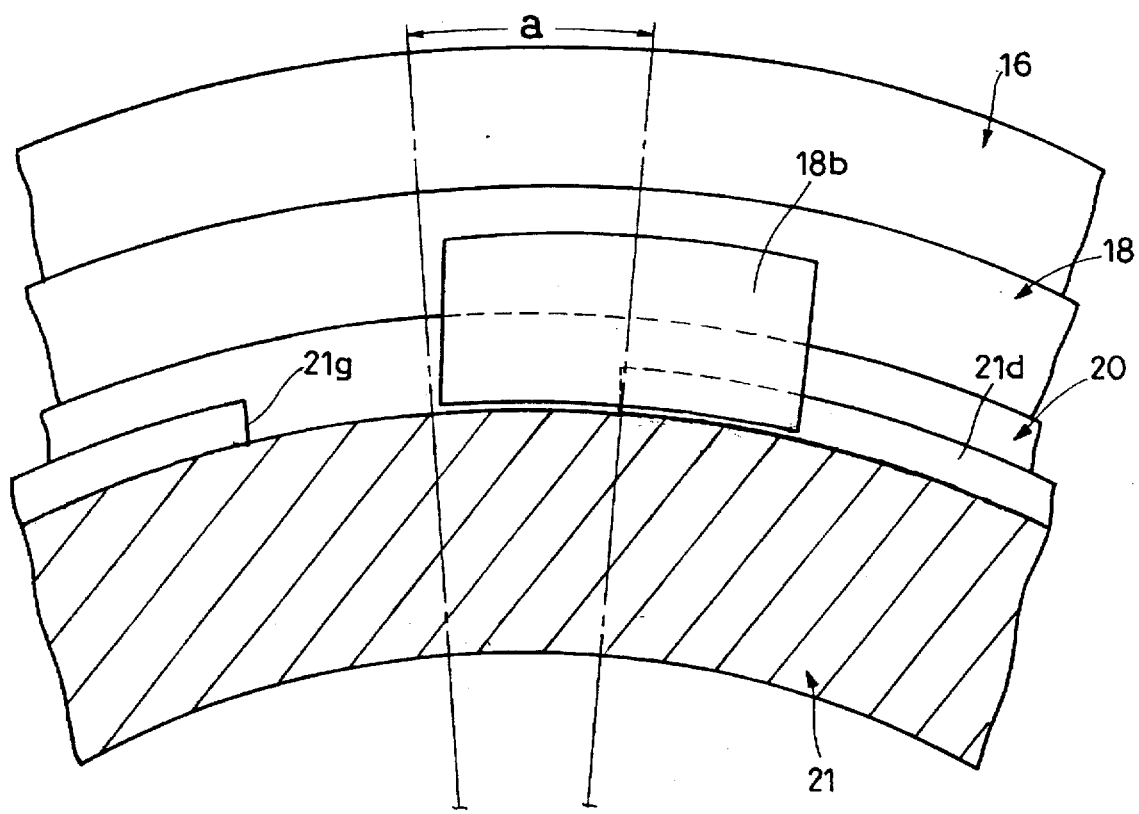
FIG. 3 is a partially broken rear view of the stationary lens barrel, a rotatable barrel, and a linear movement guide barrel in the lens barrel shown in FIG. 1.

FIG. 3 shows a partially broken rear view of the stationary barrel 16, the rotatable barrel 18, and the linear movement guide member 21, as viewed from the rearward side (from the right side in FIG. 1) of the lens barrel 10 shown in FIG. 1 in the optical axis direction. FIG. 2 is a developed plane view showing the engagement of the stationary barrel 16 and the rotatable barrel 18, as viewed through the stationary barrel 16.

Figure 5:
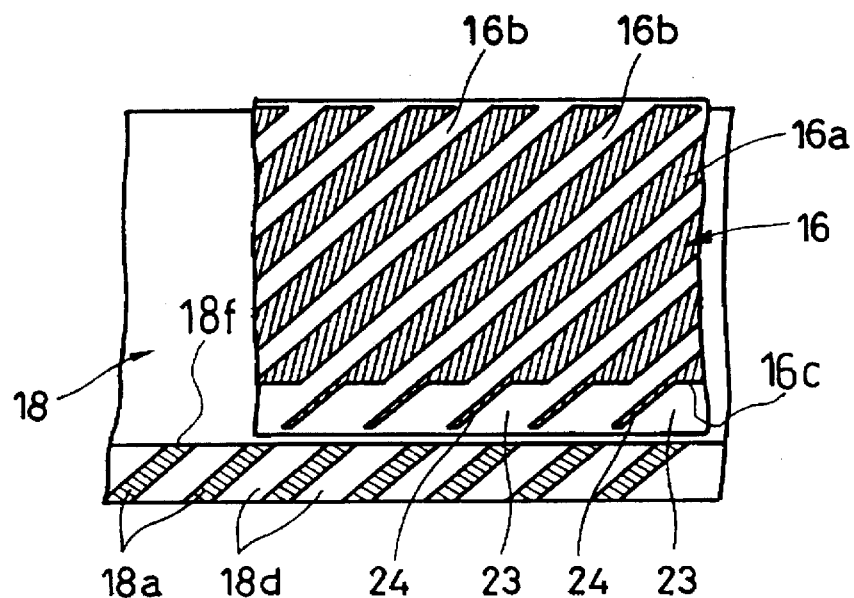
FIG. 5 is a partially broken developed plane view of the stationary lens barrel and the rotatable lens barrel before they engage.
Figure 6:
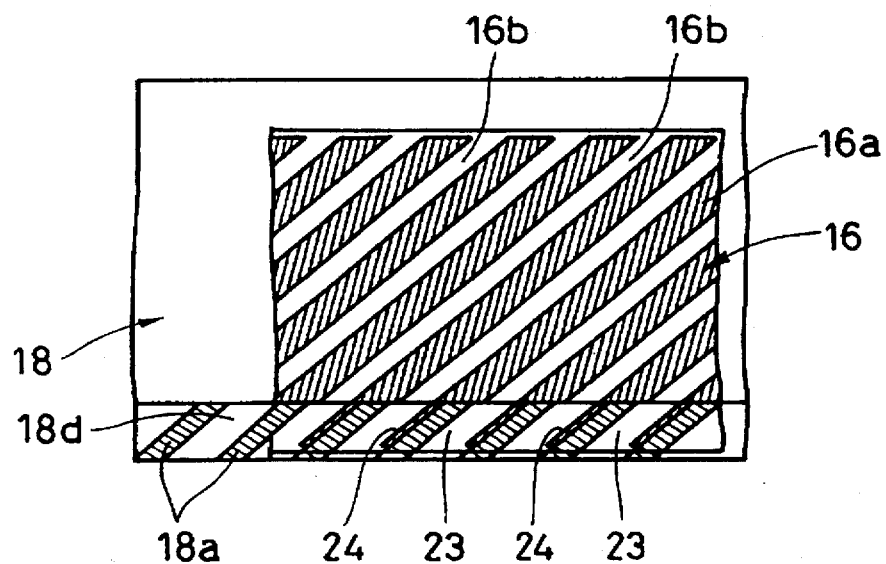
FIG. 6 is a partially broken developed plane view of the stationary barrel and the rotatable barrel when they loosely engage.

FIGS. 5 and 6 are developed plane views of the stationary barrel 16 and the rotatable barrel 18 before they engage and when they loosely engage, respectively.

Figure 7:
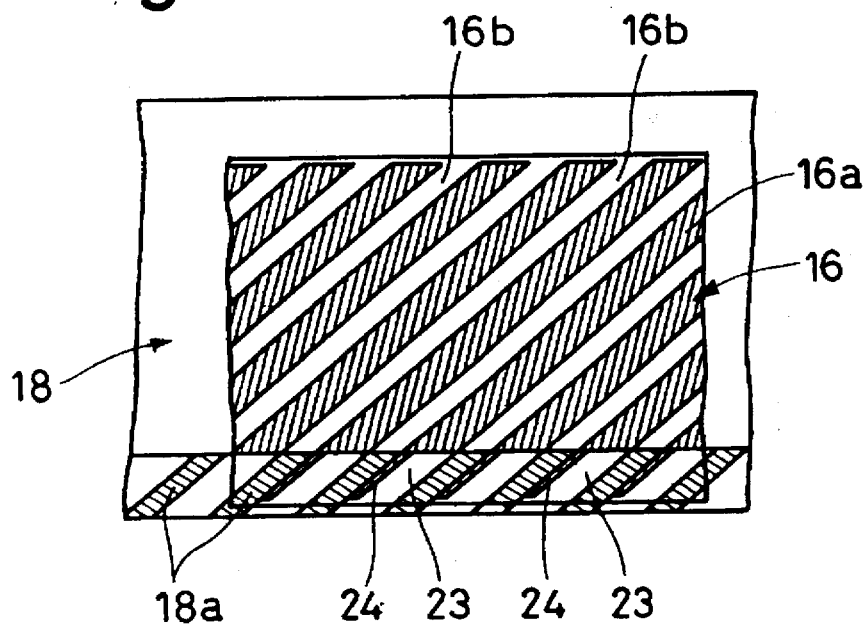
FIG. 7 is a partially broken developed plane view of the stationary barrel and the rotatable barrel after the rotatable barrel has been slightly rotated in the clockwise direction from the position shown in FIG. 6.
Figure 8:
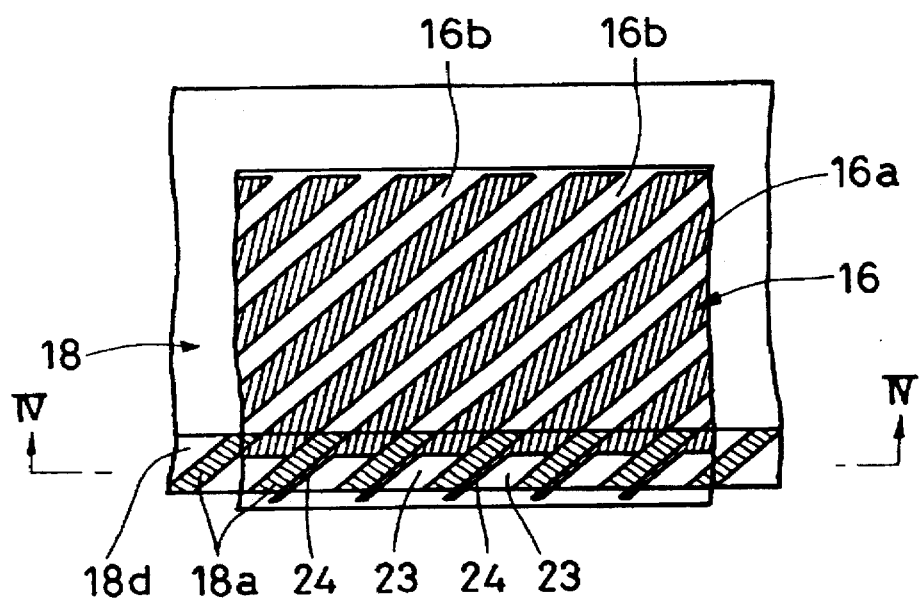
FIG. 8 is a partially broken developed plane view of the stationary barrel and the rotatable barrel, shown in an accommodated position which is established by rotating the rotatable barrel in the clockwise direction from the position shown in FIG. 7.

FIGS. 7 and 8 are developed plane views of the stationary barrel 16 and the rotatable barrel 18 when the rotatable barrel 18 has been slightly rotated in the clockwise direction from the position shown in FIG. 6, and when the rotatable barrel 18 has been further rotated to an accommodated position (retracted position), respectively.

Figure 4:
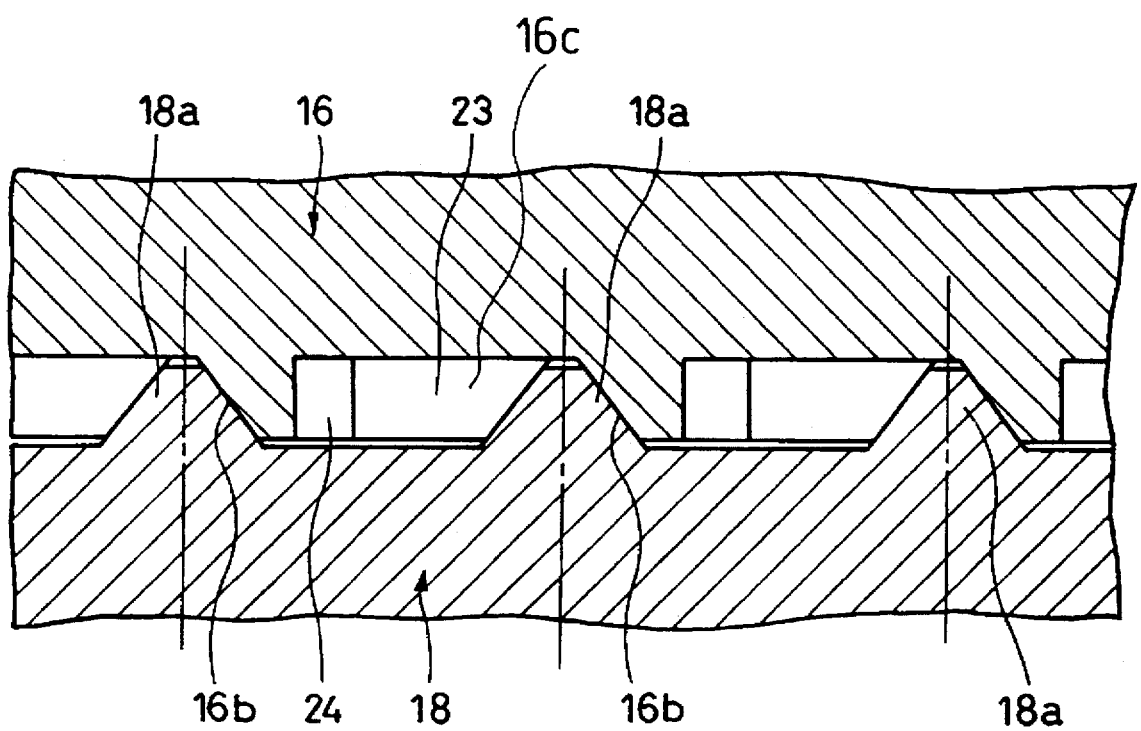
FIG. 4 is a sectional view taken along the line IV—IV in FIG. 8.

FIG. 4 is a sectional view taken along the line IV—IV in FIG. 8.

As can be seen in FIG. 3, the outer peripheral flange 21d of the linear movement guide member 21 is provided with a plurality of cut-away portions 21g which are spaced at an equi-angular distance. The hook-like projections 18b are inserted in the corresponding cut-away portions 21g. As shown in FIG. 1, the hook-like projections 18b project rearwardly from the cut-away portion 21g in the optical axis direction. When the linear movement guide member 21 rotates, the bent ends of the hook-like projections 18b are arranged to engage the outer peripheral flange 21d. In addition, projections 21c formed on the linear movement guide member 21 are loosely fitted in the linear movement guide grooves 16d to move the linearly movable barrel 20 in the optical axis direction while the rotatable barrel 18 is rotating.

As may be seen in FIG. 5, the stationary barrel 16 is provided with thread-relief portions 23 provided on the rear ends of the respective thread ridges of the multiple-female threads 16a. The thread-relief portions 23 are formed by partially cutting away the thread ridges (engaging ends) of the multiple-female threads 16a at the rear ends (engaging ends) thereof in the clockwise direction to reduce the width of the thread ridges in the circumferential direction.

As a result of forming the thread-relief portions 23, thin-wall portions 24 on the ends of the thread ridges in the counterclockwise direction are then formed. Together with the forming of the thin-wall portions 24, thread-end portion 16c is formed on each multiple-female thread 16a. Due to this thread-end portion 16c, in the assembling process, the axial movement of the multiple-male threads 18a, i.e., the rotatable barrel 18, is securely suspended by abutting the thread-end portion 16c and thread-end portion 18f while the thin-wall portions 24 come into contact with the multiple-male threads 18a prior to the rotation of the rotatable barrel 18. In FIG. 4, the thread-end portions 16c are shown. On the other hand, the surfaces of the thread ridges of the multiple-female threads 16a and the multiple-male threads 18a, which come into contact with each other after the stationary barrel 16 and the rotatable barrel 18 relatively rotate, extend linearly in the developed plane view (refer to FIG. 7).

It should be noted that the thread relief-portions 23 are a type of measure for not-working the multiple-male and multiple-female threads 18a and 16a as a screw mechanism even when the rotatable barrel 18, which is inserted in the stationary barrel 16 from the rearward direction, is rotated in the clockwise direction. More concretely, as shown in FIG. 6, the thread ridges of the multiple-male thread 18a and the thread-end portions 18f abut against the thin-wall portions 24 and the thread-end portions 16c. By abutting both thread-end portions 16c and 18f, the axial movement of the rotatable barrel 18 is securely suspended. From this state, even if the rotatable barrel 18 is rotated in the clockwise direction, torque generated by the rotation of the rotational barrel 18 is transmitted nowhere because there is no thread engagement due to the thread-relief portions 23.

In other words, the thread-relief portions 23 permit the stationary barrel 16 and the rotatable barrel 18 to relatively rotate without causing the relative movement of the stationary barrel 16 and the rotatable barrel 18 in the axial direction until the multiple-male thread 18a comes into contact with the neighboring thin-wall portions 24 (the female-thread 16a). Accordingly, the rotatable barrel 18 is properly set in an accommodating (initial) position with respect to the stationary barrel 16. In addition to the above, it is apparent that the linearly movable barrel 20, which is linearly guided by the linear movement guide grooves 16d formed on the stationary barrel 16, does not axially and linearly move because, as explained, no torque is transmitted from the rotatable barrel 18.

In FIG. 5, numerals 16b are the roots between the thread ridges of the multiple-female threads 16a, and numerals 19d are the roots between the thread ridges of the multiple-male threads 18a.

The camera as constructed above operates as follows.

If the zoom switch (not shown) is moved to the telephoto position when the lens barrel 10 is in the accommodated position shown in FIG. 1, the zoom motor (not shown) is driven. Consequently, the rotation of the zoom motor is transmitted to the rotatable barrel 18 through the pinion 11 and the outer peripheral thread 18e.

As a result, the rotatable barrel 18 is advanced in the optical axis direction together with the linear movement guide member 21 which is associated with the hook-like projections 18b through the outer peripheral flange 21d, while the rotatable barrel 18 is rotating relative to the stationary barrel 16 in accordance with the relationship between the multiple-female and multiple-male threads 16a and 18a.

At the same time, with the engagement of the multiple-female threads 18c and the multiple-male threads 20c, the linearly movable barrel 20, together with the AF/AE shutter unit 30, the front lens group L1 and the rear lens group L2, advances along the optical axis. While the advancement of the linearly movable barrel 20, as the barrel 20 is guided by the linear movement guide member 21, there is no relative rotation between the stationary barrel 16 and the linearly movable barrel 20. In other words, the linearly movable barrel 20 only moves in the optical axis direction. Thereafter, the DC motor 32 is driven to move the rear lens group L2 with respect to the front lens group L1 to thereby vary the spatial distance between the lens groups for obtaining an in-focus state.

If the zoom switch is moved to the wide-angle position when the lens barrel 10 is in the advanced position, the rotatable barrel 18 is moved toward the accommodated position while the barrel 18 is rotating in accordance with the relationship between the multiple-female threads 16a and the multiple-male threads 18a. At the same time, the linearly movable barrel 20 is also moved toward the accommodated position.

As explained, the linearly movable barrel 20 is linearly moved without relative rotation with respect to the stationary barrel 16 due to the linear movement guide member 21 while the rotatable barrel 18 is relatively rotating with respect to the linearly movable barrel 20 due to the engagement of the multiple-female threads 18c and the multiple-male threads 20c. As a result, the spatial distance between the front lens group L1 and the rear lens group L2 is varied to vary the focal length. The movement of the linearly movable barrel 20 is stopped when the zoom switch is turned OFF. Thereafter, the rear lens group L2 is moved relative to the front lens group L1 to obtain an in-focus state.

The rotary feed mechanism of the lens barrel 10 is assembled as follows:

(i) the rotatable barrel 18 is inserted in the stationary barrel 16;

(ii) the linearly movable barrel 20 is inserted in the rotatable barrel 18;

(iii) the linear movement guide member 21 is fixedly secured to the linearly movable barrel 20; and (iv) during the above assembling operations, the hook-like projections 18b of the rotatable barrel 18 are inserted in the cut-away portions 21g of the linear movement guide member 21, and the rotatable barrel 18 is rotated until the hook-like projections 18b engage the outer peripheral flanges 21d. Upon completion of the engaging of the hook-like projections 18b and the outer peripheral flanges 21, the multiple-male threads 18a abut against the multiple-female threads 16a.

During assembly step (iv), the rotatable barrel 18 is moved from the position shown in FIG. 5 to the position shown in FIG. 6 in which the engaging surfaces of the thread ridges of the multiple-male threads 18a are located in the thread relief portions 23, and abut against the corresponding thin-wall portions 24. Furthermore, the thread-end portion 18f abut the thread-end portion 16c of the multiple-female threads 16a. As FIG. 6 shows, the thread ridges of the multiple-male threads 18a are arranged to be apart from the thread ridges of the multiple-female threads 16a because of the thread-relief portions 23. Accordingly, even when the rotatable barrel 18 is rotated with respect to the stationary barrel 16, no torque is transmitted to the stationary barrel 16. In other words, these multiple-male threads 18a and the multiple-female threads 16a do not work as a screw feed mechanism until a relative rotation therebetween amounts to a predetermined angle.

When the rotatable barrel 18 is rotated by an angle α (e.g., α=about 3 to 4°) in the clockwise direction in FIG. 3, the thread ridges of the multiple-male threads 18a move in the thread-relief portions 23, and then the thread ridges come into contact with the opposed surfaces of the thin-wall portions 24. Further rotation of the rotatable barrel 18 causes the rotatable barrel 18 to move in the axial direction due to the feed-screw function produced by the engagement of the thread ridges of the multiple-male threads 18a and the thin-wall portions 24 (the multiple-female threads 16a). Consequently, the rotatable barrel 18 is slightly advanced with respect to the stationary barrel 16, so that the multiple-male threads 18a loosely engage the multiple-female threads 16a to prevent the rotatable barrel 18 from being disengaged from the stationary barrel 16 in the accommodated position (refer to FIG. 8).

As mentioned above, no axial movement of the rotatable barrel 18 takes place during the transfer from the position shown in FIG. 6 to the position (slightly before the accommodated position) shown in FIG. 7. Moreover, the rotation from the position shown in FIG. 7 to the position (accommodated position) shown in FIG. 8 causes only a slight axial advancement of the rotatable barrel 18. Accordingly, behind the rotatable barrel 18, there is no need to provide a space to absorb an anticipated axial advancement of the rotatable barrel 18. In other words, a useless space only for the assembling or disassembling operation is eliminated, so that the rotary feed mechanism explained through the embodiment contributes to a realization of a compact camera.

Figure 9:
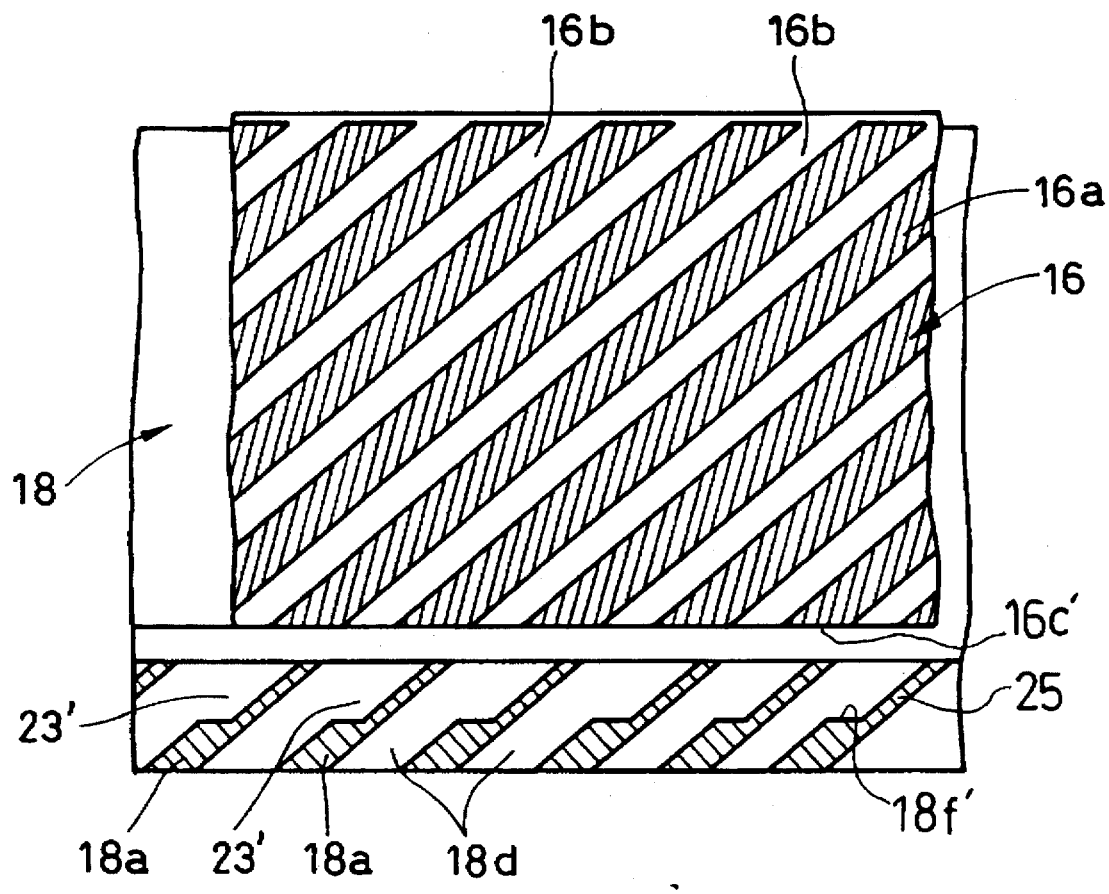
FIG. 9 is a partially broken plane view of a rotary feed mechanism according to a second embodiment of the present invention.

Although the thread-relief portions 23 are provided in the stationary barrel 16 in the above-mentioned embodiment, the present invention is not limited to this embodiment. In other words, as shown in FIG. 9 (the second embodiment), it is possible to provide thread-relief portions 23' on the engaging surfaces of the multiple-male threads 18a of the rotatable barrel 18 in place of the thread-relief portions 23 provided on the engaging surfaces of the multiple-female threads 16a of the stationary barrel 16. The thread-relief portions 23' comprise thin-wall portions 25 and thread-end portions 18f'. In this case, similar to the first embodiment, the axial movement of the rotatable barrel 18 is suspended by abutting the thread-end portions 18f' and corresponding thread-end portions 16c'.

Figure 10:
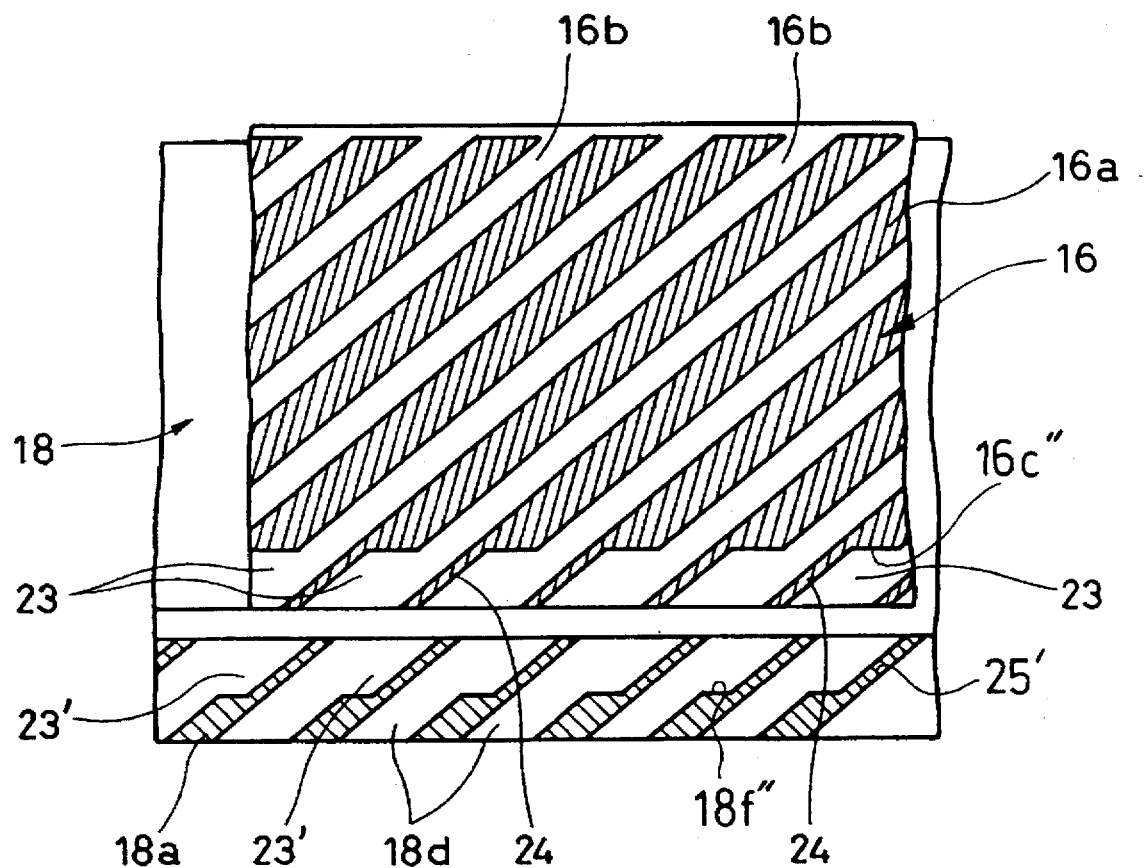
FIG. 10 is a partially broken plane view of a rotary feed mechanism according to a third embodiment of the present invention.

Alternatively, it is also possible to provide the thread-relief portions 23' on the engaging surfaces of the multiple-male threads 18a of the rotatable barrel 18 in addition to the thread-relief portions 23 provided on the engaging surfaces of the multiple-female thread 16a of the stationary barrel 16, as shown in FIG. 10 (the third embodiment). In this alternative, the angular range, in which no axial advancement of the rotatable barrel 18 occurs, can be expanded. When the rotatable barrel 18 and the stationary barrel 16 are being assembled, the thin-wall portions 25' are inserted along the thin-wall portions 24. As the thin-wall portions 25' are made thinner than a normal thread ridge of the multiple-male threads 18a, a period of time, in which the thin-wall portions 25' come into contact with the neighboring multiple-female threads 16a to which the thin-wall portions 24 are formed, is made longer in comparison with the single thin-wall type embodiments. In the second or third embodiment, the surfaces of the multiple-female threads 16a and the multiple-male threads 18a that come into contact with each other when the stationary barrel 16 and the rotatable barrel 18 relatively rotate extend linearly in a developed plan view, similar to the first embodiment.

The present invention is not limited thereto although the rotary feed mechanism is applied only to the connection between the stationary barrel 16 and the rotatable barrel 18 in the illustrated embodiments. It is possible to apply the rotary feed mechanism to the connection between the rotatable barrel 18 and the linearly movable barrel 20. In this case, the axial movement of the linearly movable barrel 20 relative to the rotatable barrel 18 when the linearly movable barrel 20 is assembled to the accommodated position is eliminated.

The present invention can be applied, for example, to a multiple-step (more than two-step) feed type lens barrel although the above discussion has been directed to a lens barrel having a two-step feed type zoom mechanism.

As can be understood from the above discussion, according to the present invention, a rotary feed mechanism, comprising at least a cylindrical member and an inner cylindrical member, both of which are engaged through multiple-start threads, is provided with an idling means, on either the cylindrical member or the inner cylindrical member, for preventing an axial movement of the cylindrical member with respect to the inner cylindrical member, or vice versa. Furthermore, according to the idling means, in the assembling process, the engaging work of the multiple-start threads is made easier.

What is claimed is:

1. A rotary feed mechanism of a camera, said rotary feed mechanism comprising:

a stationary barrel secured to a camera body, said stationary barrel provided with multiple-female threads in an inner surface of said stationary barrel;

a rotatable barrel coaxially and movably insertable in said stationary barrel, said rotatable barrel provided with multiple-male threads to engage said multiple-female threads on a predetermined surface portion of said rotatable barrel, said rotatable barrel provided with multiple-female threads in an inner surface of said rotatable barrel;

a linearly movable lens barrel coaxially insertable in said rotatable barrel, said linearly movable lens barrel provided with multiple-male threads, on a predetermined surface portion of said linearly movable lens barrel, to engage said multiple-female threads, said linearly movable lens barrel supporting a plurality of lenses arranged to be movable in an optical axis direction;

linear guiding means, provided on said linearly movable lens barrel, for moving said linearly movable lens barrel along said optical axis direction without causing rotation while said rotatable barrel is rotated, said linearly guiding means having a projection to be guided by a linear guide groove formed on said stationary barrel;

idling means, provided on said stationary barrel, for substantially preventing said rotatable barrel from advancing in said optical axis direction with respect to said stationary barrel only when said rotatable barrel is being assembled in a predetermined initial position with respect to said stationary barrel.

2. The rotary feed mechanism of the camera according to claim 1, wherein said idling means is provided on said multiple-female threads at an end of said stationary barrel closer to said camera body.

3. The rotary feed mechanism of the camera according to claim 2, wherein said idling means is formed by cutting away a predetermined length of said multiple-female threads so that thin-wall portions of said multiple-female threads are formed in a direction of a lead of said multiple-female threads, and thread-end portions of said multiple-female threads are formed in a circumferential direction of said stationary barrel in a manner that a cross sectional area of a thread except for that of said thin-wall portion is exposed.

4. The rotary feed mechanism of the camera according to claim 3, wherein a circumferential distance between said thin-wall portions is defined as a thread-relief portion to provide a period of time, in which no torque generated by a rotation of said rotatable barrel is transmitted until said multiple-male threads of said rotatable barrel come into contact with neighboring multiple-female threads to which said thin-wall portions are formed, is secured when said rotatable barrel and said stationary barrel are being assembled.

5. The rotary feed mechanism of the camera according to claim 4, wherein said thread-end portions formed on said multiple-female threads are arranged to abut corresponding thread-end portions of said multiple-male threads of said rotatable barrel to suspend an axial movement of said rotatable barrel when said rotatable barrel is being assembled in said stationary barrel.

6. The rotary feed mechanism of the camera according to claim 5, wherein said thin-wall portions of said stationary barrel are arranged to guide said multiple-male threads of said rotatable barrel when said rotatable barrel is being inserted into said stationary barrel until said thread-end portions of said rotatable barrel abut said thread-end portions of said stationary barrel.

7. The rotary feed mechanism of the camera according to claim 6, wherein said stationary barrel is provided with an elongated groove in said optical axis direction to contain a pinion to rotate said rotatable barrel, said pinion being driven by a power source in said camera body.

8. The rotary feed mechanism of the camera according to claim 7, wherein said pinion is arranged to engage a gear provided on a predetermined peripheral portion of said rotatable barrel.

9. The rotary feed mechanism of the camera according to claim 8, wherein said predetermined initial position is an accommodating position in which said rotatable barrel and said linearly movable barrel are most retracted toward said camera body.

10. The rotary feed mechanism of the camera according to claim 9, wherein said rotary feed mechanism further comprises another idling means provided on said multiple-male threads of said rotatable barrel.

11. The rotary feed mechanism of the camera according to claim 10, wherein said another idling means is formed by cutting away a predetermined length of said multiple-male threads so that thin-wall portions of said multiple-male thread are formed in a direction of a lead of said multiple-male threads, and thread-end portions of said multiple-male threads are formed in a circumferential direction of said rotatable barrel.

12. The rotary feed mechanism of the camera according to claim 11, wherein said thin-wall portions of said rotatable barrel are arranged to come into contact with said thin-wall portions of said stationary barrel so that period of time, in which no torque generated by a rotation of said rotatable barrel is transmitted until said thin-wall portions of said rotatable barrel come in contact with neighboring multiple-female threads to which said thin-wall portions are formed, is made longer when said rotatable barrel and said stationary barrel are being assembled.

13. The rotary feed mechanism of the camera according to claim 12, wherein end portions of said thin-wall portions of said rotatable barrel are made to abut said thread-end portions of said stationary barrel, while end portions of said thin-wall portions of said stationary barrel are made to abut said thread-end portions of said rotatable barrel when said rotatable barrel are being assembled in said stationary barrel.

14. A rotary feed mechanism of a camera, said rotary feed mechanism comprising:
- a first barrel provided with multiple-female threads in an inner surface of said stationary barrel;
- a second barrel coaxially and movably insertable in said first barrel, said second barrel provided with multiple-male threads to engage said multiple-female threads on a predetermined surface portion of said second barrel;
- idling means, provided on said first barrel, for substantially preventing said second barrel from advancing in said optical axis direction with respect to said first barrel only when said second barrel is being assembled in a predetermined initial position with respect to said first barrel.

15. The rotary feed mechanism according to claim 14, wherein said idling means is provided on said multiple-female threads at an end of said first barrel.

16. The rotary feed mechanism according to claim 15, wherein said idling means is formed by cutting away a predetermined length of said multiple-female threads so that thin-wall portions of said multiple-female threads are formed in a direction of a lead of said multiple-female threads, and thread-end portions of said multiple-female threads are formed in a circumferential direction of said first barrel in a manner that a cross sectional area of a thread, except for that of said thin-wall portion is exposed.

17. The rotary feed mechanism according to claim 16, wherein a circumferential distance between said thin-wall portions is defined as a thread-relief portion to provide a period of time, in which no torque generated by a rotation of said second barrel is transmitted until said multiple-male threads of said second barrel come in contact with neighboring multiple-female thread to which said thin-wall portion is formed, is secured when said second barrel and said first barrel are being assembled.

18. The rotary feed mechanism according to claim 17, wherein said thread-end portions formed on said multiple-female threads are arranged to abut corresponding thread-end portions, formed in a manner that entire cross sectional area are exposed, of said multiple-male threads of said second barrel to suspend an axial movement of said second barrel when said second barrel is being assembled in said first barrel.

19. The rotary feed mechanism according to claim 18, wherein said thin-wall portions of said first barrel are arranged to guide said multiple-male threads of second barrel when said second barrel is being inserted into said first barrel until said thread-end portions of said second barrel abut said thread-end portions of said first barrel.

20. The rotary feed mechanism of the camera according to claim 19, wherein said rotary feed mechanism further comprises another idling means provided on said multiple-male threads of said second barrel.

21. The rotary feed mechanism of the camera according to claim 20, wherein said another idling means is formed by cutting away a predetermined length of said multiple-male threads so that thin-wall portions of said multiple-male thread are formed in a direction of a lead of said multiple-male threads, and thread-end portions of said multiple-male threads are formed in a circumferential direction of said second barrel in a circumferential direction of said second barrel in a manner that cross sectional areas of said threads except for that of said thin-wall portion are exposed.

22. The rotary feed mechanism of the camera according to claim 21, wherein said thin-wall portions of said second barrel are arranged to come into contact with said thin-wall portions of said first barrel so that said period of time, in which no torque generated by a rotation of said second barrel is transmitted until said thin-wall portions of said second barrel come in contact with neighboring multiple-female threads to which said thin-wall portion are formed, is made longer when said second barrel and said first barrel are being assembled.

23. The rotary feed mechanism of the camera according to claim 22, wherein said end portions of thin-wall portions of said second barrel are made to abut said thread-end portions of said first barrel.

24. A method of assembling cylindrical members of a camera, said method comprising:
(i) providing a first cylindrical member having multiple-female threads;
(ii) providing a second cylindrical member having multiple-male threads;
(iii) coaxially inserting said second cylindrical member into said first cylindrical member;
(iv) preventing said second cylindrical member from advancing in an axial direction with respect to said first cylindrical member while said second cylindrical member is being rotated with respect to said first cylindrical member when said second cylindrical member is assembled in a predetermined initial position.

* * * * *